(12) United States Patent
Pearl, Jr. et al.

(10) Patent No.: US 11,859,124 B2
(45) Date of Patent: Jan. 2, 2024

(54) METHOD FOR DESIGNING POLYMERS FOR EFFECTIVE FLUID LOSS CONTROL

(71) Applicant: Halliburton Energy Services, Inc., Houston, TX (US)

(72) Inventors: William Cecil Pearl, Jr., Spring, TX (US); John Paul Bir Singh, Kingwood, TX (US); Samuel Jason Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/643,022

(22) PCT Filed: Apr. 5, 2019

(86) PCT No.: PCT/US2019/026177
§ 371 (c)(1),
(2) Date: Feb. 28, 2020

(87) PCT Pub. No.: WO2020/204958
PCT Pub. Date: Oct. 8, 2020

(65) Prior Publication Data
US 2021/0147742 A1 May 20, 2021

(51) Int. Cl.
*C09K 8/487* (2006.01)
(52) U.S. Cl.
CPC .................................. *C09K 8/487* (2013.01)
(58) Field of Classification Search
CPC ........ C09K 8/487; C09K 8/035; C09K 8/575; E21B 21/00; E21B 21/06; E21B 33/13; E21B 41/00
See application file for complete search history.

(56) References Cited

U.S. PATENT DOCUMENTS

| | | | |
|---|---|---|---|
| 4,515,635 A | 5/1985 | Rao | |
| 6,739,806 B1* | 5/2004 | Szymanski | C09K 8/46 405/267 |
| 7,067,000 B1 | 6/2006 | Szymanski et al. | |
| 7,360,598 B1 | 4/2008 | Lewis et al. | |
| 7,388,045 B1 | 6/2008 | Lewis et al. | |
| 7,399,355 B2 | 7/2008 | Szymanski et al. | |
| 8,609,595 B2 | 12/2013 | Morgan et al. | |
| 9,783,727 B2 | 10/2017 | Ahman et al. | |
| 11,078,400 B2 | 8/2021 | Pisklak et al. | |
| 11,174,198 B2 | 11/2021 | Morgan et al. | |
| 11,225,595 B2 | 1/2022 | Jimenez et al. | |
| 2004/0262000 A1* | 12/2004 | Morgan | C04B 40/0039 166/293 |
| 2007/0101905 A1* | 5/2007 | Chatterji | C09K 8/487 106/672 |
| 2007/0284104 A1* | 12/2007 | Beckman | C04B 40/0039 166/293 |
| 2007/0284105 A1* | 12/2007 | Beckman | C04B 24/2623 166/293 |
| 2012/0267101 A1* | 10/2012 | Cooke, Jr. | C09K 8/887 166/278 |
| 2017/0364607 A1 | 12/2017 | Kaushik et al. | |
| 2019/0358853 A1 | 11/2019 | Morgan et al. | |
| 2019/0367797 A1 | 12/2019 | Morgan et al. | |
| 2020/0332172 A1 | 10/2020 | Pisklak et al. | |
| 2020/0332643 A1 | 10/2020 | Pisklak et al. | |
| 2020/0333318 A1 | 10/2020 | Benkley et al. | |

OTHER PUBLICATIONS

ISRWO International Search Report and Written Opinion for PCT/US2019/026177 dated Jan. 2, 2020.

* cited by examiner

*Primary Examiner* — Kumar R Bhushan
(74) *Attorney, Agent, or Firm* — Thomas Rooney; Tumey Law Group PLLC (57) ABSTRACT

A method of well treatment may include: providing a polymer; correlating performance of the polymer to a least one physical property of the polymer; and preparing a treatment fluid comprising the polymer.

12 Claims, 7 Drawing Sheets

METHOD FOR DESIGNING POLYMERS FOR EFFECTIVE FLUID LOSS CONTROL

BACKGROUND

In well cementing, such as well construction and remedial cementing, cement slurries are commonly utilized. Cement slurries may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement slurry may be pumped into an annulus between the walls of the well bore and the exterior surface of the pipe string disposed therein. The cement slurry may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A particular challenge in cementing may be to retain satisfactory slurry performance throughout the cementing operation. Oftentimes, a polymer is added to the cement slurry such that a consistent fluid volume within the cement slurry may be maintained. A polymer may reduce the loss of water through a cement filter cake from the wellbore being cemented into the formation or other permeable zones penetrated by the wellbore. The loss of water from the cement slurry may have many deleterious effects on the cement including changes in density viscosity and thickening time as well as changes in compressive strength of the set cement among other factors. In extreme circumstances, fluid loss may increase the equivalent circulating density which may lead to formation fracture and lost circulation or flash setting of the slurry. Poor fluid loss control has been recognized in the industry as contributing to excessive density increase and annulus bridging and has been found to be a factor in some primary cementing failures. Predictability of slurry properties during pumping of the slurry and the mechanical properties of the final set cement are typically the most important parameters in a cementing operation. The oilfield industry has made considerable advances in control over slurry properties during mixing by development of polymers that increase predictability and reproducibility of cement slurries.

Polymers that contribute to reducing fluid loss as described above may be included in fluids. When included in a fluid, the polymer referred to as fluid loss control additives or polymeric fluid loss control additives. Oftentimes fluid loss control additives have product specifications that allow for a range of operating conditions such as a range of temperature, concentration of soluble species such as salts, size of annular space to cement through, among other factors. As such, two polymeric fluid loss control additives from different manufacturers may meet all specification requirements for fluid loss control but may have vastly different physical configurations. While both fluid loss control additives may meet all technical specifications, the fluid loss performance and chemistry characteristics does not constrain the fluid loss control additive outside of the specific chemistry. For two particular fluid loss control additives, a variability may exist between the chemical structures has an effect on the particle wetting and viscosity of the cement slurry the fluid loss control additive is added to. Particle wetting and viscosity may be factors which may affect mixability. The term mixability refers to the ability of the components comprising the cement slurry to blend to form the cement slurry. One of ordinary skill in the art will recognize that the term "mixability" or the term "to blend" may generally refer to adequately wetting the surfaces of the dry particles of the cement blend when using a standard laboratory procedure for oil well cements. The methods described herein may allow one of ordinary skill in the art to derive an analytical relationship between polymer properties and performance.

BRIEF DESCRIPTION OF THE DRAWINGS

These drawings illustrate certain aspects of some of the embodiments of the present disclosure and should not be used to limit or define the disclosure.

DETAILED DESCRIPTION

The present disclosure may generally relate to polymers and treatment fluids that include polymers. Provided herein are methods that may include identifying and developing an analytical relationship between polymer properties and performance. The techniques disclosed herein may include measuring physicochemical properties of a polymer and correlating the properties to desirable properties of the polymer. The techniques may be used to design and prepare a treatment fluid, for example. At least one embodiment may include measuring physicochemical properties of a polymer. The physicochemical properties may include, but are not limited to, number average number average, weight average, polydispersity index, radius of gyration Rg, wet time, rheology, degree of branching, number of carbon atoms, ratio of carbon atoms to sulfur, nitrogen, and/or oxygen, and/or fluid loss property.

An example embodiment of correlating desirable properties with at least one physicochemical property will now be described for an example polymer. For a polymeric fluid loss control additive, the fluid loss performance may be correlated to the molecular weight of the polymer. However, as will be illustrated below, in addition to the number or mass average molecular weight, there is a contribution from the dispersity to the performance of the polymeric fluid loss control additive. Polymerization reactions typically generate a distribution of polymer sizes around an average value. As used herein, "polydispersity index" (PDI) refers to a measure of the distribution of molecular mass in a given polymer sample. The polydispersity index is calculated by dividing the weight average molecular weight (Mw) by the number average molecular weight (Mn). As used herein, the term "weight average molecular weight" generally refers to a molecular weight measurement that depends on the contributions of polymer molecules according to their sizes. As used herein, the term "number average molecular weight" generally refers to a molecular weight measurement that is calculated by dividing the total weight of all the polymer molecules in a sample with the total number of polymer molecules in the sample. These terms are well-known by those of ordinary skill in the art.

There may exist an optimum PDI at which fluid loss performance and mixability of a polymer are balanced such that fluid loss is minimized while mixability is maximized. Another factor which may contribute to the performance of a polymer may be the degree of branching of the polymer. The degree of branching may be measured in terms of the radius of gyration of a polymer molecule, wherein the larger radius of gyration for a given molecular weight equates to a lower degree of branching. As will be illustrated below, polymeric fluid loss control additive specifications that do not include PDI and radius of gyration may pass as a given product but may have vastly different performance characteristic.

To illustrate the effects of PDI and radius of gyration on polymeric fluid loss control additives, a test was prepared to compare a polymeric fluid loss control additive from different vendors, each polymeric fluid loss control additive having the same specification. Five samples were obtained from different vendors and formulated with Portland class H cement. The density of the prepared slurries was fixed at 16.2 pounds per gallon (1941 kg/m³). The concentration of the polymeric fluid loss control additive was varied from 0.2% to 0.6% BWOC (by weight of cement). The slurries were evaluated for fluid loss, rheology and for the wet (or mix) time, at room temperature. The results are shown in Table 1. The number average (Mn) and weight average (Mw) are expressed in kilo Daltons (kDa), fluid loss (FL) is expressed in mL, wet time is expressed in seconds, polydispersity index (PDI) is dimensionless, radius of gyration Rg is expressed in nano-meters, and concentration is expressed by weight of cement. Each test was performed according to API 10B-2 and manufacturer's instructions for a gel permeation chromatography and multi angle light scattering instrument. One of ordinary skill in the art should recognize the laboratory tests used.

TABLE 1

| | Polymer Properties | | | | | Wet Time (sec) | | | Slurry Dial Reading, (100 rpm) | | | Fluid Loss (mL, doubled) | | |
|---|---|---|---|---|---|---|---|---|---|---|---|---|---|---|
| Polymer | Mn (kDa) | Mw (kDa) | PDI | Rg (nm) | 10% BWOW (Dial reading, 100 rpm) | 0.3% BWOC | 0.4% BWOC | 0.6% BWOC | 0.3% BWOC | 0.4% BWOC | 0.6% BWOC | 0.3% BWOC | 0.4% BWOC | 0.6% BWOC |
| 1 | 823 | 2202 | 2.68 | 150.2 | 88.5 | 18 | 18 | 26 | 44.0 | 62.5 | 97.5 | 72 | 40 | 22 |
| 2 | 934 | 2428.3 | 2.60 | 161.5 | 155 | 15 | 15 | 19 | 57.0 | 72.5 | 116.8 | 62 | 34 | 26 |
| 3 | 962.7 | 2627.8 | 2.73 | 181.5 | 154.5 | 14 | 17 | 23 | 57.0 | 73.5 | 119.0 | 117 | 54 | 24 |
| 4 | 1237.6 | 3655.4 | 2.95 | 214.4 | 250 | 30 | 44 | 100 | 52.5 | 75.5 | 130.0 | 54 | 30 | 26 |
| 5 | 1364 | 3798 | 2.78 | 209.4 | 236 | 20 | 25 | 69 | 57.8 | 74.8 | 135.0 | 70 | 36 | 26 |

Figure 1:
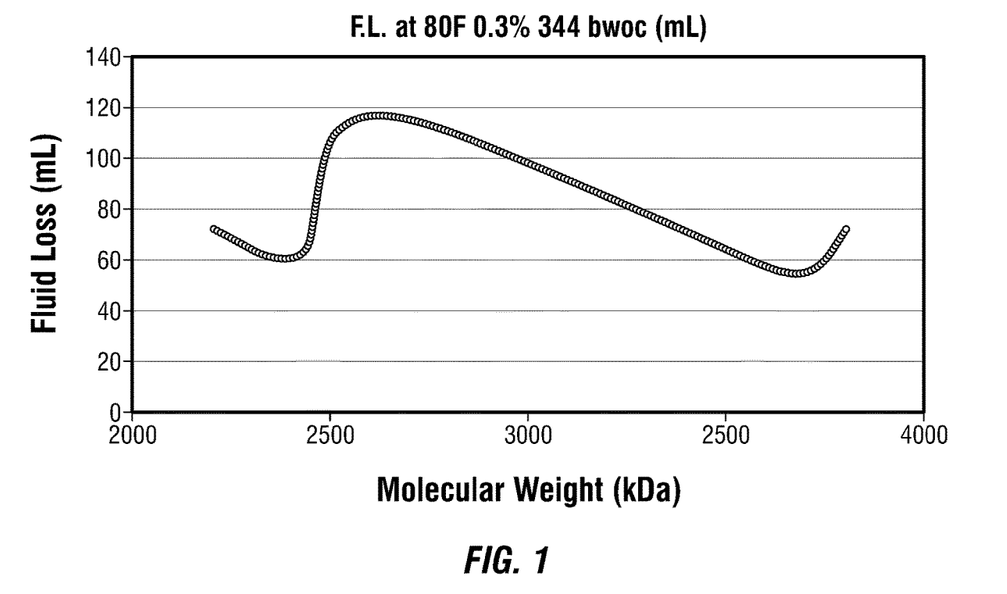
FIG. 1 is a graph of the fluid loss at for a particular set of polymeric fluid loss control agents.

FIG. 1 is a graph of the fluid loss at 80° F. (26.67° C.) of the 0.3% BWOC samples from Table 1. It can be observed that increasing molecular weight does not necessarily lead to a decrease in fluid loss. As such, molecular weight alone is not able to explain the differences between observed fluid loss performances between the samples. A model may be used that incorporates the effects of PDI, Rg, concentration, and molecular weight. One form of the model may be expressed in Equation 1.

$$\ln(FL) = A + B*PDI + C*R_g + D[CONC] + E*Mw \quad (1)$$

Another form of the model may be expressed in Equation 2.

$$FL = K*P(PDI)^{\alpha}*R(R_g)^{\beta}*C([Conc])^{\gamma}*D(Mw)^{\delta} \quad (2)$$

Figure 2:
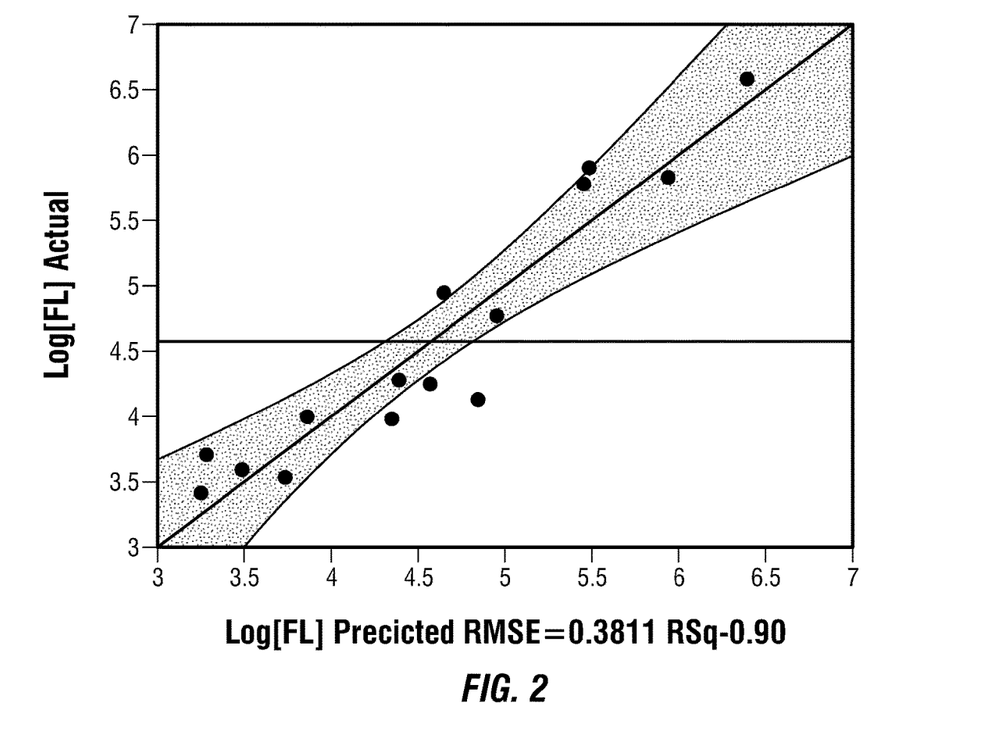
FIG. 2 is a parity plot of model for a particular set of polymeric fluid loss control agents.
Figure 3:
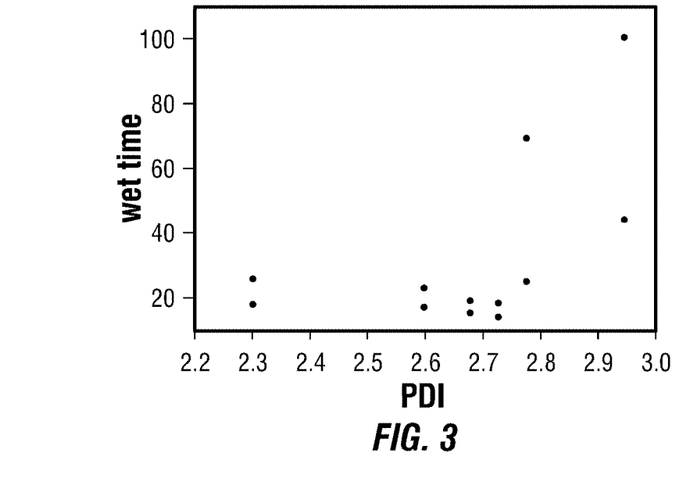
FIG. 3 is a plot of PDI versus wetting times for a particular set of polymeric fluid loss control agents.

In either model from Equation 1 or Equation 2, the constants A, B, C, D, and E and $\alpha$, $\beta$, $\gamma$, and $\delta$ may be determined by multivariate linear regression or any other regression technique. K, P, R, C and D represent functions. P(PDI) indicates a function of PDI. The functions may be exponential, logarithmic, trigonometric, polynomial, power law or combinations thereof. A parity plot of model 1, using the data of Table 1, is illustrated in FIG. 2. The constants for the parity plot model are derived from the data of Table 1. It is observed that the higher PDI indicates that as PDI increases, the fluid loss decreases. A higher PDI indicates presence of a larger distribution of molecular weights present in the sample which may lead to better control over fluid loss. However, increasing PDI may also have a negative impact on mixing. FIG. 3 illustrates a plot of PDI versus wetting times from the data of Table 1. It is observed that the wet time generally increases with increasing PDI. Wet time is the time it takes for an amount of polymer to hydrate. For the particular molecular weight polymers of Table 1, the optimum PDI is observed to be about 2.7 at which wet times are minimized and PDI is maximized. The optimum PDI may be a function of mean molecular weight of the polymers, for example. For polymers with lower average molecular weight than those in Table 1, the optimum PDI may be higher, and for polymers with higher average molecular weight than those in Table 1, the optimum PDI may be lower.

The models presented above may be useful to characterize a polymer and may provide insight into polymer specifications that may affect polymer performance such as PDI and radius of gyration. The models may also be used to tune a polymer for a desired performance characteristic or to design a polymer to have a desired physicochemical property. For example, the models may be used to design a polymer that has a desired wet time and/or fluid loss property. The models may be used to determine the number average number average, weight average, polydispersity index, and radius of gyration Rg that is required to achieve the desired wet time, rheology, degree of branching, number of carbon atoms, ratio of carbon atoms to sulfur, nitrogen, and/or oxygen, and/or fluid loss property. The models may also be used to design a treatment fluid with a desired property with a given polymer additive. The models may be used to determine the required concentration of the polymer to include to achieve the desired fluid loss, for example.

Figure 4:
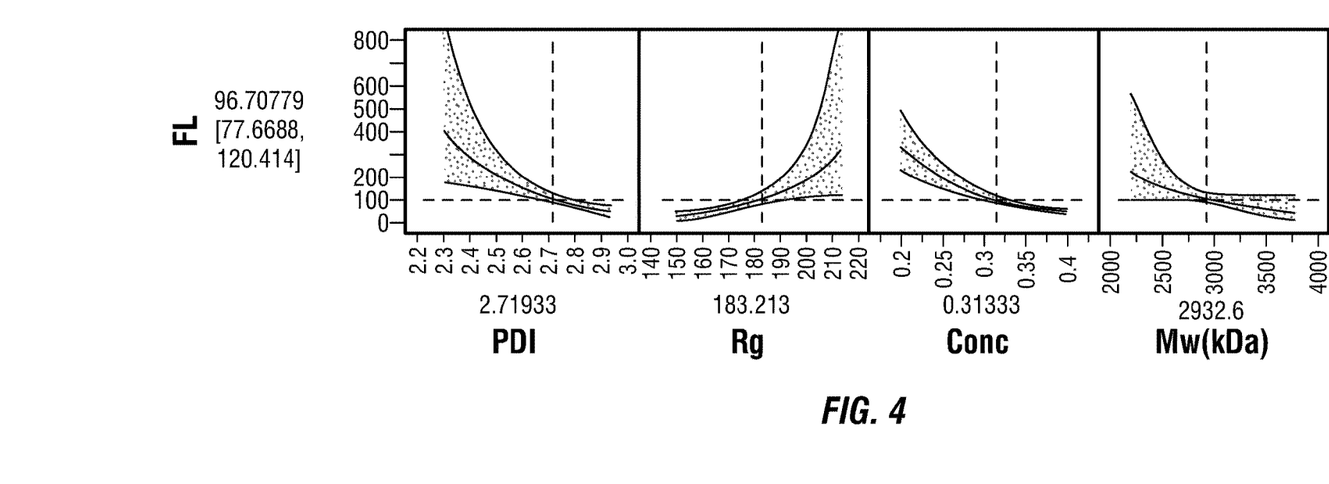
FIG. 4 is a plot of PDI, radius of gyration, concentration of polymer, and molecular weight for a set of polymeric fluid loss control additives.

FIG. 4 illustrates multiple plots of PDI, radius of gyration, concentration of polymer, and molecular weight for a set of polymeric fluid loss control additives. For the given set of materials, it is observed that the fluid loss may decrease as a function of increasing PDI, increasing molecular weight, and increasing concentration. For a given radius of gyration and PDI, and increase in molecular weight may be inversely correlated to fluid loss. As one of ordinary skill in the art will appreciate, radius of gyration and molecular weight are covariates. Increasing molecular weight without affecting radius of gyration may be accomplished by introducing branching into the polymer backbone, for example, with may lead to a decrease in fluid loss performance.

The previously discussed properties and models of polymers may be beneficial when designing a cement that has a fluid loss requirement and/or a mixability requirement. As discussed above, physicochemical properties such as PDI may affect the fluid loss performance and wet time for a slurry comprising a polymer as a polymeric fluid loss control additive. A cement operator may have a plurality of polymers available to include in a cement slurry. The plurality of polymers may have varying chemistries as the plurality of polymers may be sourced from various vendors. Generally, a test slurry may be made comprising a selected polymer and the test slurry may then be tested for fluid loss and mixability. Given that there may be wide variability between polymers of the same chemistry from different manufacturers, several tests may need to be prepared before a suitably mixable and fluid loss controlled slurry is found. The trial-and-error nature of the testing may require time to complete and may be inefficient. Additionally, the resultant slurry may be complex as the trial-and-error methodology may not find the optimum PDI to wet time at a concentration.

A method to design a cement slurry, or other wellbore treatment fluids comprising a polymer, may include providing a plurality of polymers, providing at least one of a required wet time, fluid rheology, and required fluid loss performance of a cement slurry comprising a polymer, correlating the fluid loss performance and/or wet time of each of the available polymers based on one or more physicochemical properties, and selecting a polymer based at least in part on the correlation. The selecting may further include selecting a concentration of the polymer. The correlation may include a model as previously described. The model may be specific to the chemistry of the polymer. In some examples, the correlation, and by extension the model, may use physicochemical parameters of the polymer inputs or as constants, for example.

Cement slurries may generally include water and a cement along with a polymer. The polymer may be included as a polymeric fluid loss control additive. A cement blend may include one or more bulk dry materials of various cementitious components, which may be dry blended to form the cement dry blend prior to combination with the water. In some cases, "chemical additives" may be also dry blended with the cement blend. Alternatively, some of the chemical additives may not be combined until the blend (sometimes referred to as bulk blend) has been mixed with the water. The cement components may generally be described as alkali soluble. In one embodiment, a cement slurry may include water and a cement blend, wherein the cement blend includes hydraulic cement and two or more silica sources, such as cement kiln dust and a natural pozzolan.

The cement slurries may have a density suitable for a particular application. The cement slurries may have a density in the range of about 7 pounds per gallon ("ppg") (840 kg/m$^3$) to about 23 ppg (2760 kg/m$^3$). In the foamed examples, the foamed cement slurries may have a density in the range of about 7 ppg to about 15 ppg (or even lower).

The water used in the cement slurries may include, for example, freshwater, saltwater (e.g., water containing one or more salts dissolved therein), brine (e.g., saturated saltwater produced from subterranean formations), seawater, or combinations thereof Generally, the water may be from any source, provided that it does not contain an excess of compounds that may undesirably affect other components in the cement slurry. The water may be included in an amount sufficient to form a pumpable slurry. The water may be included in the cement slurries in the range of about 40% to about 200% by weight of the cement slurry ("bwoc"). In some examples, the water may be included in an amount in the range of about 40% to about 150% bwoc.

The cement slurry may include two or more cement components. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include Portland cements, gypsum, and high alumina content cements, among others. Portland cements that are suited for use in the present disclosure may be classified as Classes A, C, G, and H cements according to American Petroleum Institute, API Specification for Materials and Testing for Well Cements, API Specification 10, Fifth Ed., Jul. 1, 1990. In addition, in some examples, Portland cements suitable may be classified as ASTM Type I, II, III, I/II, III/V and V. Cement slurries that may be considered "low Portland" may be designed by use of the techniques disclosed herein.

Where present, the hydraulic cement generally may be included in the cement slurries in an amount sufficient to provide the desired compressive strength and/or density. The hydraulic cement may be present in the cement slurries in any suitable concentration, including in an amount in the range of about 0% to about 99% bwoc. The hydraulic cement may be present in an amount ranging between any of and/or including any of about 1%, about 5%, about 10%, about 20%, about 40%, about 60%, about 80%, or about 90% bwoc. The cement component may be considered "low Portland" in that the Portland cement (where used) may be present in the cement slurry in an amount of about 40% or less bwoc and, alternatively, about 10% or less. Cement slurries may also be designed that are free (or essentially free) of Portland cement.

In addition to Portland cement, additional cement components may be used that can be considered alkali soluble. A cement component is considered alkali soluble where it is at least partially soluble in an aqueous solution of pH 7.0 or greater. Certain of the alkali soluble cement components may include a geopolymer cement, which may include an aluminosilicate source, a metal silicate source, and an activator. The geopolymer cement may react to form a geopolymer. A geopolymer is an inorganic polymer that forms long-range, covalently bonded, non-crystalline networks.

Geopolymers may be formed by chemical dissolution and subsequent re-condensation of various aluminosilicates and silicates to form a 3D-network or three-dimensional mineral polymer. The activator may include, but is not limited to, metal hydroxides chloride salts such as KCl, $CaCl_2$, NaCl, carbonates such as $Na_2CO_3$, silicates such as sodium silicate, aluminates such as sodium aluminate, and ammonium hydroxide. The aluminosilicate source may include any suitable aluminosilicate. Aluminosilicate is a mineral comprising aluminum, silicon, and oxygen, plus counter-cations. A wide variety of suitable minerals may be an aluminosilicate source in that they may include aluminosilicate minerals. Each aluminosilicate source may potentially be used in a particular case if the specific properties, such as slurry, may be known. Some minerals such as andalusite, kyanite, and sillimanite are naturally occurring aluminosilicate sources that have the same slurry, $Al_2SiO_5$, but differ in crystal structure. Each mineral andalusite, kyanite, or sillimanite may react more or less quickly and to different extents at the same temperature and pressure due to the differing crystal structures. Other suitable aluminosilicate sources may include, but are not limited to, calcined clays, partially calcined clays, kaolinite clays, lateritic clays, illite clays, natural glass, mine tailings, blast furnace slag, and coal fly ash. The metal silicate source may include any suitable metal silicate. A silicate is a compound containing an anionic silicon compound. Some examples of a silicate include the orthosilicate anion also known as silicon tetroxide anion, $SiO_4^{4-}$ as well as hexafluorosilicate $[SiF_6]^{2-}$. Other common silicates include cyclic and single chain silicates which may have the general formula $[SiO_{2+n}]^{2n-}$ and sheet-forming silicates $([SiO_{2.5}]^-)_n$. Each silicate example may have one or more metal cations associated with each silicate molecule. Some suitable metal silicate sources and may include, without limitation, sodium silicate, magnesium silicate, and potassium silicate.

Where present, the geopolymer cement generally may be included in the cement slurries in an amount sufficient to provide the desired compressive strength and/or. The geopolymer cement may be present in the cement slurries in any suitable concentration, including an amount in the range of about 0% to about 99% bwoc. The geopolymer cement may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of geopolymer cement for a particular application.

Additional cement components that are alkali soluble may include a silica source. The silica source may be any suitable material that provides silica to the cement slurry. By inclusion of the silica source, a different path may be used to arrive at a similar product as from Portland cement. A pozzolanic reaction may be induced wherein silicic acid ($H_4SiO_4$) and portlandite ($Ca(OH)_2$ react to form a cement product (calcium silicate hydrate). If other compounds, such as, aluminate, are present in the silica source, additional reactions may occur to form additional cement products, such as calcium aluminate hydrates. Calcium hydroxide necessary for the reaction may be provide from other cement components, such as Portland cement, or may be separately added to the cement slurry. Examples of suitable silica sources may include fly ash, slag, silica fume, crystalline silica, silica flour, cement kiln dust ("CKD"), natural glasses, metakaolin, diatomaceous earth, zeolite, shale, and agricultural waste ash (e.g., rice husk ash, sugar cane ash, and bagasse ash), among other. Some specific examples of the silica source will be discussed in more detail below. Where present, the silica source generally may be included in the cement slurries in an amount sufficient to provide the desired compressive strength and/or density. The silica source may be present in the cement slurries in any suitable concentration, including in an amount in the range of about 0% to about 99% bwoc. The silica source may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of silica source for a particular application.

An example of a suitable silica source may include fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash includes both silica and lime, so it may set to form a hardened mass upon mixing with water. Class F fly ash generally does not contain a sufficient amount of lime to induce a cementitious reaction, therefore, an additional source of calcium ions is necessary for a set-delayed cement slurry comprising Class F fly ash. Where used, lime may be mixed with Class F fly ash in any suitable amount, including in an amount in the range of about 0.1% to about 100% by weight of the fly ash. In some instances, the lime may be hydrated lime. Suitable examples of fly ash include, but are not limited to, POZMIX® A cement additive, commercially available from Halliburton Energy Services, Inc., Houston, Texas.

Another example of a suitable silica source may include slag. Slag is generally a by-product in the production of various metals from their corresponding ores. By way of example, the production of cast iron can produce slag as a granulated, blast furnace by-product with the slag generally comprising the oxidized impurities found in iron ore. Slag generally does not contain sufficient basic material, so slag cement may be used that further may include a base to produce a settable slurry that may react with water to set to form a hardened mass. Examples of suitable sources of bases include, but are not limited to, sodium hydroxide, sodium bicarbonate, sodium carbonate, lime, and combinations thereof.

Another example of a suitable silica source may include CKD. Cement kin dust or "CKD", as that term is used herein, refers to a partially calcined kiln feed which is removed from the gas stream and collected, for example, in a dust collector during the manufacture of cement. Usually, large quantities of CKD are collected in the production of cement that are commonly disposed of as waste. CKD is another component that may be included in examples of the cement slurries.

Another example of a suitable silica source may include natural glass. Certain natural glasses can exhibit cementitious properties, in that they may set and harden in the presence of hydrated lime and water. The natural glass may also be ground, for example. Generally, the natural glass may have any particle size distribution as desired for a particular application. In certain embodiments, the natural glass may have a mean particle size in a range of from about 1 micron to about 200 microns. The mean particle size corresponds to d50 values as measured by particle size analyzers such as those manufactured by Malvern Instruments, Worcestershire, United Kingdom. One of ordinary skill in the art, with the benefit of this disclosure, would be able to select a particle size for the natural glass suitable for use for a chosen application.

Another example of a suitable silica source may include metakaolin. Generally, metakaolin is a white pozzolan that may be prepared by heating kaolin clay, for example, to temperatures in the range of about 600° to about 800° C.

Another example of a suitable silica source may include shale. Among other things, shale included in the cement slurries may react with excess lime to form a suitable cementing material, for example, calcium silicate hydrate. A variety of shales are suitable, including those comprising silicon, aluminum, calcium, and/or magnesium. An example of a suitable shale includes vitrified shale. Generally, the shale may have any particle size distribution as desired for a particular application. In certain embodiments, the shale may have a particle size distribution in the range of about 37 micrometers to about 4,750 micrometers.

Another example of a suitable silica source may include zeolite. Zeolites generally are porous alumino-silicate minerals that may be either a natural or synthetic material. Synthetic zeolites are based on the same type of structural cell as natural zeolites, and may include aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples comprising zeolite may include zeolite in combination with a cation such as $Na^+$, $K^+$, $Ca^{2+}$, $Mg^{2+}$, etc. Zeolites comprising cations such as sodium may also provide additional cation sources to the cement slurry as the zeolites dissolve.

The cement slurries may further include hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the cement slurries, for example, to form a hydraulic slurry with the silica source. The hydrated lime may be included in any suitable concentration, including, but not limited to, in a silica source-to-hydrated-lime weight ratio of about 10:1 to about 1:1 or a ratio of about 3:1 to about 5:1. Where present, the hydrated lime may be included in the cement slurries in an amount in the range of from about 10% to about 100% by weight of the silica source, for example. The hydrated lime may be present in an amount ranging between any of and/or including any of about 10%, about 20%, about 40%, about 60%, about 80%, or about 100% by weight of the silica source. One of ordinary skill in the art, with the benefit of this disclosure, would recognize the appropriate amount of hydrated lime to include for a chosen application.

The cement slurries may also include a calcium source other than hydrated lime, which may be used in addition, or in place of the hydrated lime. In general, calcium and a high pH, for example a pH of 7.0 or greater, may be needed for certain cementitious reactions to occur. A potential advantage of hydrated lime may be that calcium ions and hydroxide ions are supplied in the same molecule. In another example, the calcium source may be $Ca(NO_3)_2$ or $CaCl_2$ with the hydroxide being supplied form NaOH or KOH, for example. One of ordinary skill would understand the alternate calcium source and hydroxide source may be included in a cement slurry in the same way as hydrated lime. For example, the calcium source and hydroxide source may be included in any suitable amount, including, but not limited to, a silica source-to-hydrated-lime weight ratio of about 10:1 to about 1:1 or a ratio of about 3:1 to about 5:1. Where present, the alternate calcium source and hydroxide source may be included in the cement slurries in an amount in the range of from about 10% to about 100% by weight of the silica source, for example. The alternate calcium source and hydroxide source may be present in an amount ranging between any of and/or including any of about 10%, about 20%, about 40%, about 60%, about 80%, or about 100% by weight of the silica source. One of ordinary skill in the art, with the benefit of this disclosure, would recognize the appropriate amount of alternate calcium source and hydroxide source to include for a chosen application.

Other additives suitable for use in cementing operations also may be included in the cement slurries as needed for a particular application. Examples of such additives include, but are not limited to: weighting agents, activators, lightweight additives, gas-generating additives, mechanical-property-enhancing additives, lost-circulation materials, filtration-control additives, fluid-loss-control additives, defoaming agents, foaming agents, dispersants, thixotropic additives, and combinations thereof. One of ordinary skill in the art, with the benefit of this disclosure, would be able to select an appropriate additive for a particular application.

The following statements may describe certain aspects of the disclosure but should not be read to be limiting to a particular embodiment.

Statement 1. A method of well treatment comprising: providing a polymer; correlating performance of the polymer to a least one physical property of the polymer; and preparing a treatment fluid comprising the polymer.

Statement 2. The method of statement 1 wherein the at least one physical property includes number average molecular weight, weight averaged molecular weight, polydispersity index, radius of gyration, or combinations thereof.

Statement 3. The method of any of statements 1-2 wherein the step of correlating includes using a model of fluid loss, the model being a function of a least one physical property of the polymer.

Statement 4. The method of any of statements 1-3 wherein the model is specific to a chemistry of the polymer.

Statement 5. The method of any of statements 1-4 wherein the model is of the form of: $\ln(FL)=A+B*PDI+C*R_g+D[CONC]+E*Mw$ where A, B, C, D, and E are constants, PDI is polydispersity index, $R_g$ is radius of gyration, conc is concentration, Mw is number average molecular weight, and FL is fluid loss.

Statement 6. The method of any of statements 1-5 wherein the model is in the form of: $FL=K*P(PDI)^{\alpha}*R(R_g)^{\beta}*C([Conc])^{\gamma}*D(Mw)^{\delta}$ where $\alpha$, $\beta$, $\gamma$, $\delta$, K, P, R, C, and D are constants, PDI is polydispersity index, $R_g$ is radius of gyration, conc is concentration, Mw is number average molecular weight, and FL is fluid loss.

Statement 7. The method of any of statements 1-6 wherein the step of correlating includes correlating polydispersity index to wet time of the polymer.

Statement 8. The method of any of statements 1-7 wherein the step of designing the treatment fluid includes selecting a concentration of the polymer based at least in part of the correlation of polydispersity index to wet time.

Statement 9. The method of any of statements 1-8 further comprising providing a required wet time, a required fluid loss performance, or both and wherein selecting a concentration of the polymer includes selecting a concentration of the polymer with a such that the polymer provides the required wet time and/or the required fluid loss performance.

Statement 10. The method of any of statements 1-9 wherein the fluid includes at least one fluid selected from the group consisting of a cement slurry, a spacer fluid, a displacement fluid, a flushing fluid, and combinations thereof.

Statement 11. A method of cementing comprising: providing a plurality of polymers; correlating fluid loss performance and wet time of each of the plurality of polymers to a least one physical property and/or concentration of each of the plurality of polymers; selecting at least one polymer from the plurality of poly polymers wherein the selecting is based at least in part on the correlation; preparing a cement slurry comprising the at least one polymer.

Statement 12. The method of statement 11 wherein the step of correlating includes using a model of fluid loss, the model being a function of a least one physical property of a polymer.

Statement 13. The method of any of statements 11-12 wherein the model is of the form of: $\ln(FL)=A+B*PDI+C*R_g+D[CONC]+E*Mw$ where A, B, C, D, and E are constants, PDI is polydispersity index, $R_g$ is radius of gyration, conc is concentration, Mw is number average molecular weight, and FL is fluid loss.

Statement 14. The method of any of statements 11-13 wherein the model is in the form of: $FL=K*P(PDI)^{\alpha}*R(R_g)^{\beta}*C([Conc])^{\gamma}*D(Mw)^{\delta}$ where $\alpha, \beta, \gamma, \delta$, K, P, R, C, and D are constants, PDI is polydispersity index, $R_g$ is radius of gyration, conc is concentration, Mw is number average molecular weight, and FL is fluid loss.

Statement 15. The method of any of statements 11-14 wherein the step of selecting includes selecting a polymer that meets or exceeds the required wet time, the required fluid loss performance, or both.

Statement 16. The method of any of statements 11-15 wherein selecting further includes selecting a concentration of the polymer based at least in part on the correlation and the required fluid loss performance.

Statement 17. The method of any of statements 11-16 wherein the cement slurry includes the at least one polymer, a cementitious material, and water.

Statement 18. The method of any of statements 11-17 further comprising placing the cement slurry in a wellbore.

Statement 19. A method comprising: providing a plurality of polymers; correlating fluid loss performance and wet time, using a model, of each of the plurality of polymers to a least one physical property and/or concentration of each of the plurality of polymers; selecting at least one polymer and concentration thereof from the plurality of polymers, wherein the selected at least one polymer and concentration thereof meets or exceeds a required wet time and a required fluid loss performance, wherein the selecting is at least partially based on the correlation; and preparing a cement slurry comprising the at least one polymer and the concentration thereof.

Statement 20. The method of statement 19 wherein the cement slurry includes the at least one polymer, a cementitious material, and water.

Figure 5:
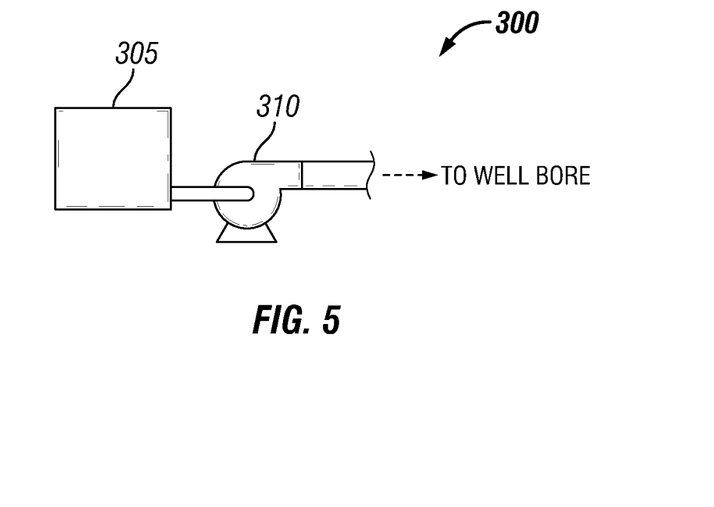
FIG. 5 is a schematic illustration of an example in which a cement slurry is used in a primary cementing application.

Example methods of using the cement slurries will now be described in more detail with reference to FIGS. 5-10. Any of the previous examples of the cement slurries and or slurries may apply in the context of FIGS. 5-10. Referring now to FIG. 5, the preparation of a cement slurry in accordance with examples will now be described. FIG. 5 illustrates a system 300 for the preparation of a cement slurry and subsequent delivery of the cement slurry to a wellbore in accordance with certain examples. As shown, the cement slurry may be mixed in mixing equipment 305, such as a jet mixer, re-circulating mixer, or a batch mixer, for example, and then pumped via pumping equipment 310 to the wellbore. In some examples, the mixing equipment 305 and the pumping equipment 310 may be disposed on one or more cement trucks as will be apparent to those of ordinary skill in the art. If a cement slurry is to be used, a bulk dry cement may be preformulated and prepared at a bulk cement plant, for example. A cement slurry may be mixed by combing the bulk dry cement in mixing equipment 305 or in other mixing equipment. Liquid additives may be blended with the cement slurry in mixing equipment 305. Pumping equipment 310 may pump the cement slurry to the wellbore.

Figure 6:
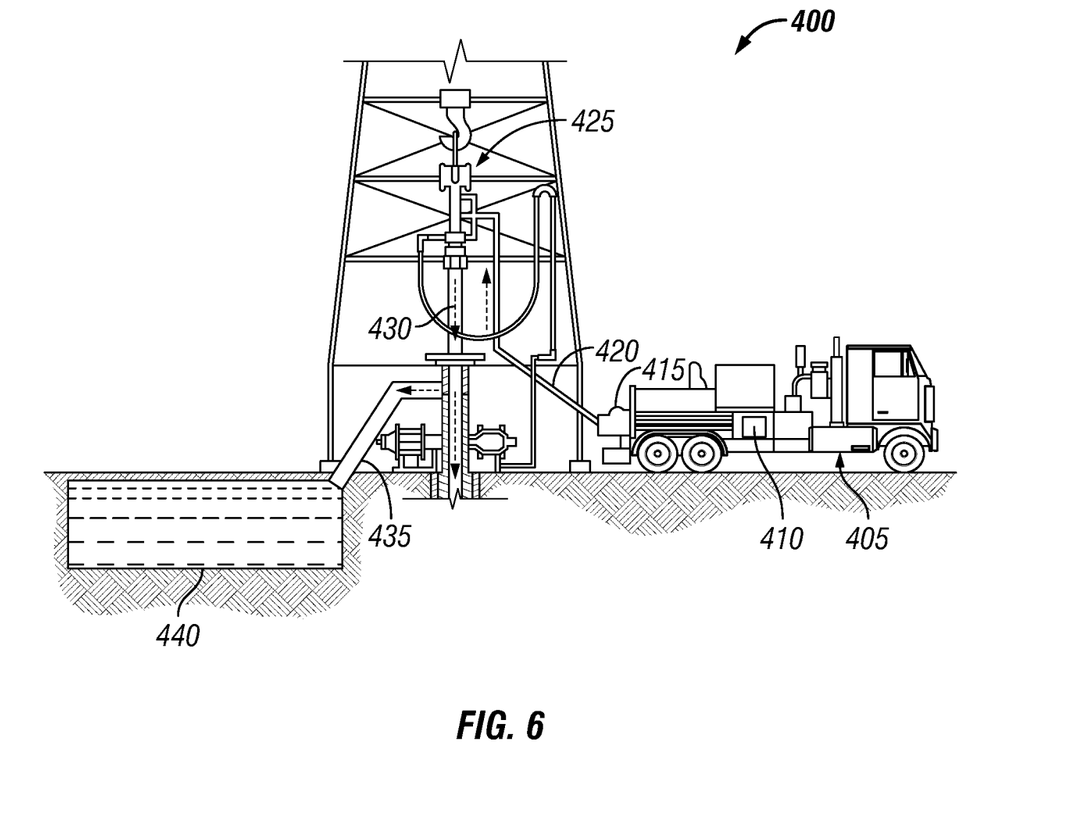
FIG. 6 is a schematic illustration showing an example of a land based cementing rig.

An example primary cementing technique using a cement slurry will now be described with reference to FIGS. 5 and 6. FIG. 6 illustrates surface equipment 400 that may be used in the placement of a cement slurry in accordance with certain examples. It should be noted that while FIG. 6 generally depicts a land-based operation, those skilled in the art will readily recognize that the principles described herein are equally applicable to subsea operations that employ floating or sea-based platforms and rigs, without departing from the scope of the disclosure. As illustrated by FIG. 6, the surface equipment 400 may include a cementing unit 405, which may include one or more cement trucks. The cementing unit 405 may include mixing equipment 410 and pumping equipment 415 (e.g., FIG. 5) as will be apparent to those of ordinary skill in the art. Cementing unit 405, or multiple cementing units 405, may pump a cement slurry 430 through a feed pipe 420 and to a cementing head 425 which conveys the cement slurry 430 downhole. Cement slurry 420 may displace other fluids present in the wellbore, such as drilling fluids and spacer fluids, which may exit the wellbore through an annulus and flow through pipe 435 to mud pit 440.

Figure 7:
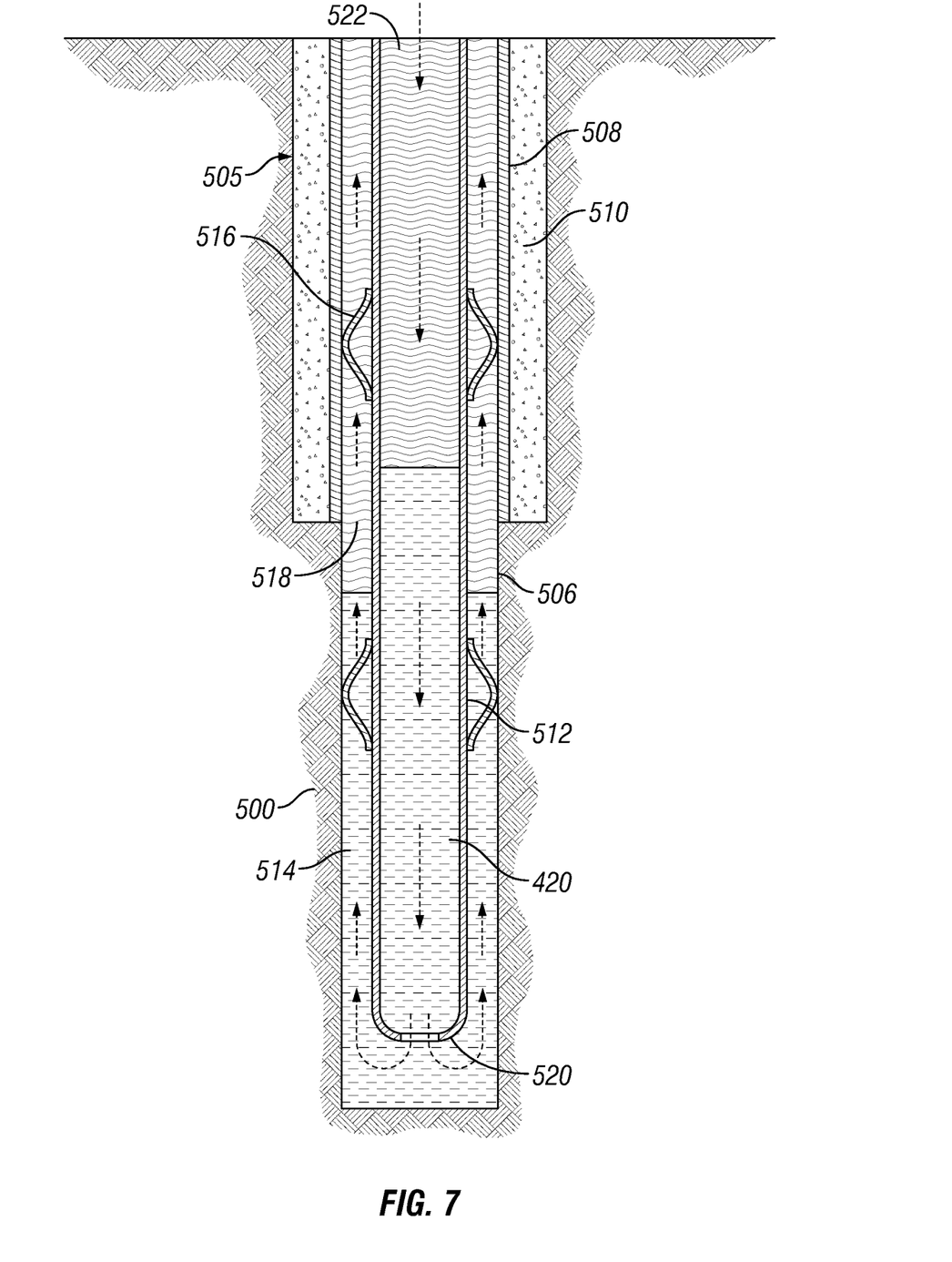
FIG. 7 is a schematic illustration showing the presence of a small perforation in a casing and cement sheath in a wellbore.

FIG. 7 generally depicts the placement of cement slurry 420 into a subterranean formation 500 in accordance with example examples. As illustrated, a wellbore 505 may be drilled into the subterranean formation 500. While wellbore 505 is shown extending generally vertically into the subterranean formation 500, the principles described herein are also applicable to wellbores that extend at an angle through the subterranean formation 500, such as horizontal and slanted wellbores. As illustrated, the wellbore 505 includes walls 506. In the illustrated example, a surface casing 508 has been inserted into the wellbore 505. The surface casing 508 may be cemented in the wellbore 505 by a cement sheath 510. In alternative examples, surface casing 508 may be secured in the wellbore 505 by a hardened resin or hardened resin-cement composite sheath in place of cement sheath 510. In the illustrated example, one or more additional conduits (e.g., intermediate casing, production casing, liners, etc.), shown here as casing 512 may also be disposed in the wellbore 505. As illustrated, there is a wellbore annulus 514 formed between the casing 512 and the walls 506 of the wellbore 505 and/or the surface casing 508. One or more centralizers 516 may be attached to the casing 512, for example, to centralize the casing 512 in the wellbore 505 prior to and during the cementing operation.

With continued reference to FIG. 7, a first spacer fluid 518 may be pumped down the interior of the casing 512. The first spacer fluid 518 may be allowed to flow down the interior of the casing 512 through the casing shoe 520 at the bottom of the casing 512 and up around the casing 512 into the wellbore annulus 514. After the first spacer fluid 518 has been pumped into the casing 512, cement slurry 240 may be pumped into the casing 512. In a manner similar to pumping the first spacer fluid 518, the cement slurry 420 may be allowed to flow down the interior of the casing 512 through the casing shoe 520 at the bottom of the casing 512 and up around the casing 512 into the wellbore annulus 514. After the cement slurry 420 has been pumped into the casing 512, a second spacer fluid 522 may be pumped into casing 512 and allowed to flow down the interior of the casing 512. The first spacer fluid 518 and the second spacer fluid 522 may be used to separate the cement slurry 420 from fluids introduced into the wellbore 505 either in front of or behind the cement slurry 420. Once the cement slurry 420 has been placed into the desired position in the wellbore annulus 514, the cement slurry 420 may be allowed to set in the wellbore annulus 514, for example, to form a hardened resin sheath that supports and positions the casing 512 in the wellbore 505. Alternatively, one or no spacer fluids may be used, and cement slurry 420 may not need to be separated from other fluids introduced previously or subsequently into wellbore 505. While not illustrated, other techniques may also be utilized for introduction of the cement slurry 420. By way of example, reverse circulation techniques may be used that include introducing the cement slurry 420 into the subterranean formation 500 by way of the wellbore annulus 514 instead of through the casing 512. These techniques may also utilize a first spacer fluid 518 and a second spacer fluid 522, or they may utilize one or none spacer fluids. As it is introduced, the cement slurry 420 may displace the first spacer fluid 518. At least a portion of the first spacer fluid 518 may exit the wellbore annulus 514 via a flow line 38 and be deposited, for example, in one or more mud pits 440, as shown on FIG. 6.

Figure 8:
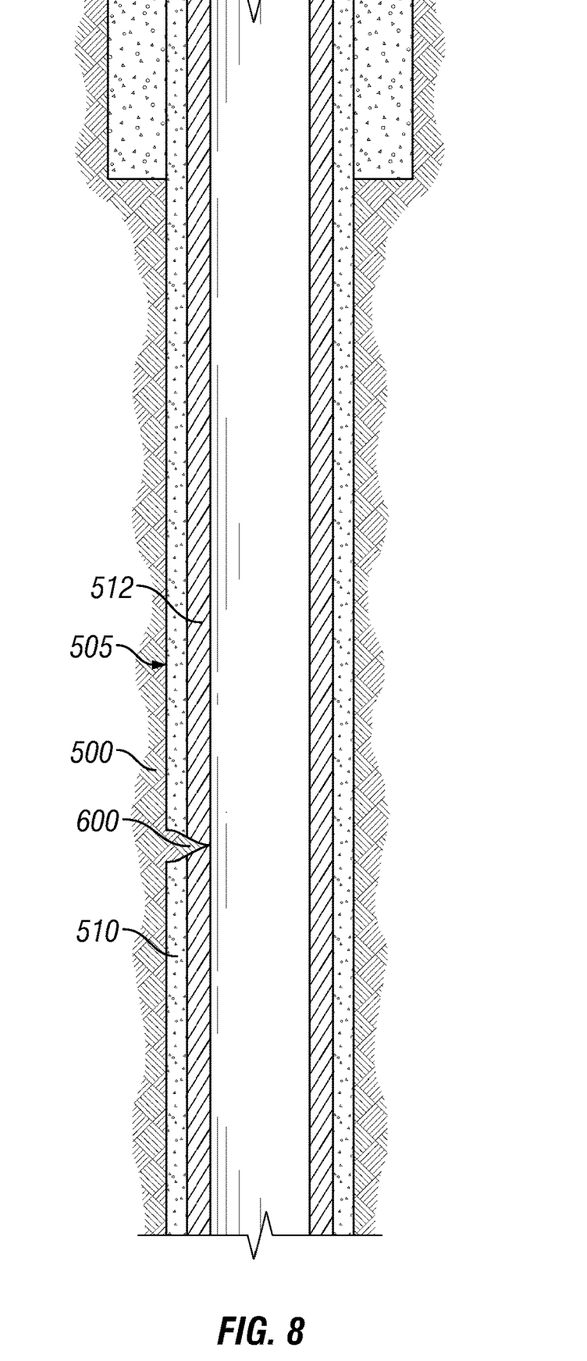
FIG. 8 is a schematic illustration of an example in which a cement slurry is used in a remedial cementing application.
Figure 9:
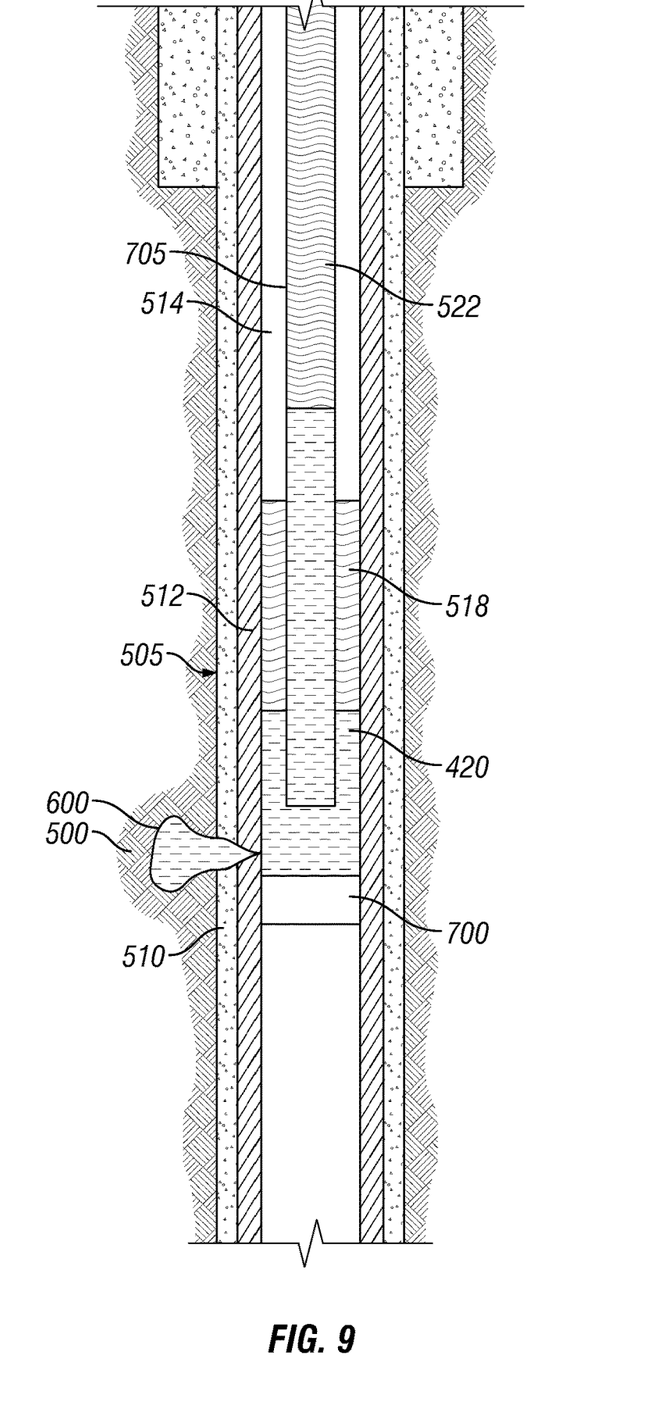
FIG. 9 is a schematic illustration of another example in which a cement slurry is used in a remedial cementing application.
Figure 10:
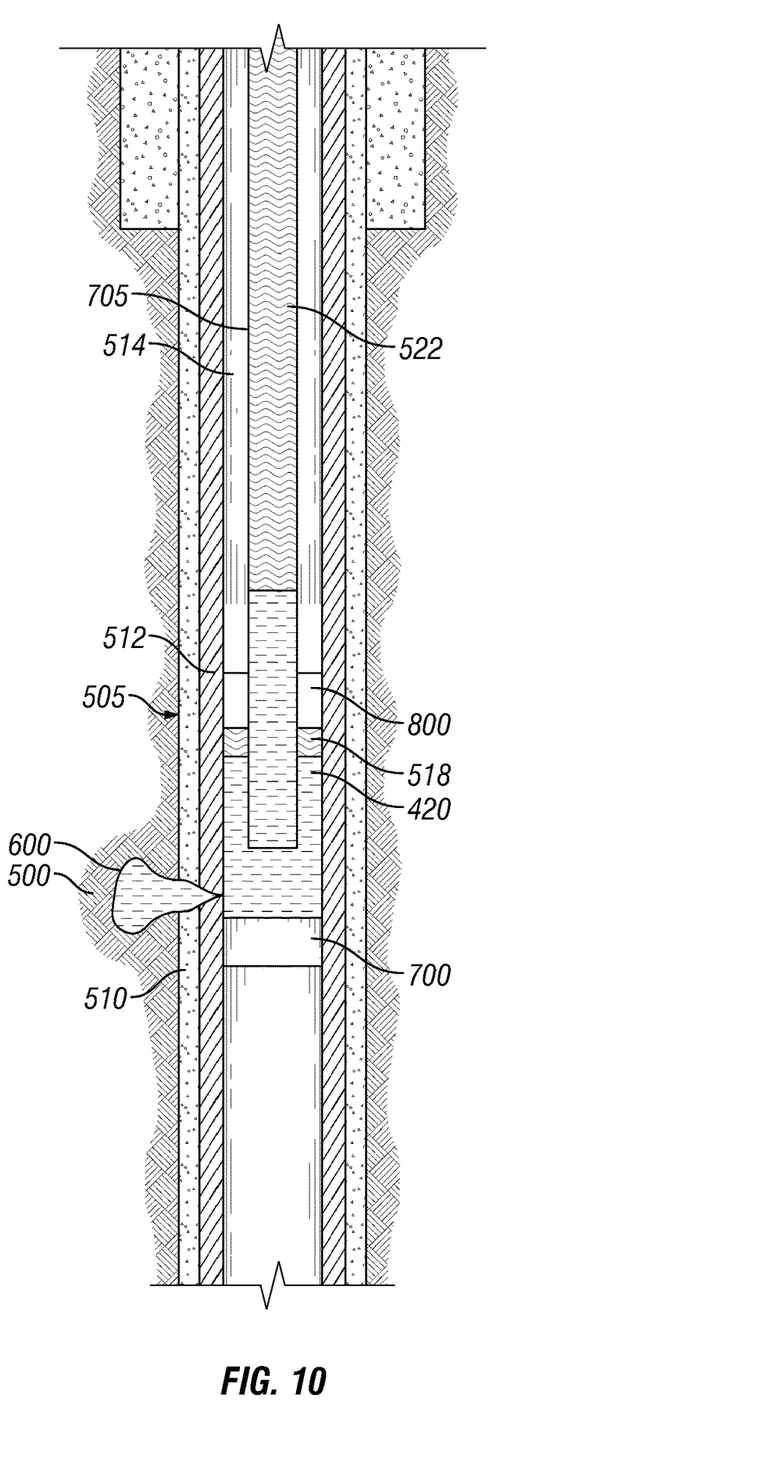
FIG. 10 is a schematic illustration of another example in which a cement slurry is used in a remedial cementing application.

FIGS. 8-10 illustrate methods of remedial or secondary cementing. Turning now to FIG. 8, there is shown a partial cross-section of a conventional producing wellbore 505 that has a primary cemented casing 512. The cement sheath 510 around the casing 512 may have defects potentially caused by a variety of issues, such as improper curing of the cement sheath 510 while it was being formed. Alternatively, the primary cementing may have been successful, but due to adverse temperatures and pressures within the subterranean formation 500, the casing 512 and/or the cement sheath 510 surrounding the casing 512 may form cracks or other types of small perforations 600. The small perforations 600 may be problematic since they may facilitate the introduction of undesirable fluids into the casing 512. As shown in FIG. 8, a small perforation 600 has formed in the cement sheath 510 and the casing 512, potentially allowing the introduction of undesirable fluids into the interior of the casing 512.

Referring now to FIG. 7, a small perforation 600 may be filled or plugged by a cement slurry 420 or a resin-cement composite. A plug 700 (the plug 700 may be any type of plug, e.g., bridge plug, etc.) may be initially placed adjacent and below the small perforation 600, to form a barrier to prevent cement slurry 420 from flowing down the wellbore 505 and therefore allow cement slurry 420 of the present disclosure to fill the small perforations 600 in the casing 512 and cement sheath 510. As shown in FIG. 9, tubing 705 (e.g., coiled tubing, drill pipe, etc.) may be lowered into wellbore 505. A first spacer fluid 518 may be pumped into the wellbore 505 via the tubing 705 and allowed to flow down the interior of the tubing 705 and into the blocked section of the wellbore 505 created by the plug 700. A portion of the first spacer fluid 518 may then flow through the small perforation 600 while another portion may reside in the annulus 514. After pumping the first spacer fluid 518 through the tubing 705, the cement slurry 420 may be pumped through the tubing 705. The cement slurry 420 may be pumped down the interior of the tubing 705 and into the blocked section of the wellbore 505 created by the plug 700. A portion of the cement slurry 420 may then flow through the small perforation 600 while another portion may reside in the annulus 514. The cement slurry 420 may be allowed to set in the small perforation 600 and in a portion of the wellbore annulus 514, for example, to form a hardened mass that seals small perforation 600 to prevent the migration of undesirable fluids into the interior of the casing 512. After the cement slurry 420 has been pumped into the tubing 705, a second spacer fluid 522 may be pumped into the tubing 705 and allowed to flow down the interior of the tubing 705 into the blocked section of the wellbore 505 created by the plug 700 and up around the tubing 705 into the wellbore annulus 514. Alternatively, one or no spacer fluids may be used, and cement slurry 420 may not need to be separated from other fluids introduced previously or subsequently into wellbore 505. The tubing 705 may then be removed. The plug 700 may also be removed. In alternative examples, plug 700 may remain in the wellbore 505 and be drilled through. After tubing 705 is removed, the portion of the hardened cement slurry 420 remaining in the wellbore 505 (i.e., the portion not in the small perforation 600) may then be drilled through.

FIG. 10 describes another example of filling a small perforation 600 with a cement slurry 420. A plug 700 (the plug 700 may be any type of plug, e.g., bridge plug, etc.) may be initially placed adjacent and below the small perforation 600, to form a barrier that may allow pressurized pumping of a cement slurry 420 of the present disclosure to fill any small perforations 600 in the casing 512 and cement sheath 510. As shown in FIG. 10, tubing 705 (e.g., coiled tubing, drill pipe, etc.) may be lowered into wellbore 505. Tubing 705 may be attached to a retainer 800 or may be inserted into a retainer 800 already placed into the wellbore 505. Retainer 800 may allow for the pressurized pumping of the cement slurry 420 into any small perforations 600. Retainer 800 must be placed adjacent to and above the small perforations 600 to be filled by cement slurry 420. Retainer 800 may be any type of retainer, for example, a cement retainer. After plug 700, tubing 705, and retainer 800 are placed, a first spacer fluid 518 may be pumped into the wellbore 505 via the tubing 705 and allowed to flow down the interior of the tubing 705 and into the blocked section of the wellbore 505 created by the plug 700. A portion of the first spacer fluid 518 may then flow through the small perf oration 600. After pumping the first spacer fluid 518 through the tubing 705, the cement slurry 420 may be pumped through the tubing 705. The cement slurry 420 may be pumped down the interior of the tubing 705 and into the blocked section of the wellbore 505 created by the plug 700. A portion of the cement slurry 420 may then flow through the small perforation 600 while another portion may reside in the space formed between the plug 700 and retainer 800. The cement slurry 420 may be allowed to set in the small perforation 600 and in the space formed between the plug 700 and retainer 800. The cement slurry 420 may then harden to form a hardened mass that seals small perforation 600 to prevent the migration of undesirable fluids into the interior of the casing 512. After the cement slurry 420 has been pumped into the tubing 705, a second spacer fluid 522 may be pumped into the tubing 705 and allowed to flow down the interior of the tubing 705 into the blocked section of the wellbore 505 created by the plug 700 and into the space formed between the plug 700 and retainer 800. Alternatively, one or no spacer fluids may be used, and cement slurry 420 may not need to be separated from other fluids introduced previously or subsequently into wellbore 505. The tubing 705 may then be removed. The plug 700 may also be removed. In alternative examples, plug 700 may remain in the wellbore 505 and be drilled through. Retainer 800 may also be removed. Conversely, in alternative examples, retainer 800 may be drilled through. After tubing 705 is removed, the portion of the hardened cement slurry 420 remaining in the wellbore 505 (i.e., the portion not in the small perforation 600) may then be drilled through.

The disclosed cement slurries and associated methods may directly or indirectly affect any pumping systems, which representatively includes any conduits, pipelines, trucks, tubulars, and/or pipes which may be coupled to the pump and/or any pumping systems and may be used to fluidically convey the cement slurries downhole, any pumps, compressors, or motors (e.g., topside or downhole) used to drive the cement slurries into motion, any valves or related joints used to regulate the pressure or flow rate of the cement slurries, and any sensors (i.e., pressure, temperature, flow rate, etc.), gauges, and/or combinations thereof, and the like. The cement slurries may also directly or indirectly affect any mixing hoppers and retention pits and their assorted variations.

It should be understood that the slurries and methods are described in terms of "comprising," "containing," or "including" various components or steps, the slurries and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of well treatment comprising:
    providing a plurality of polymers and specification requirements for fluid loss control;
    measuring physicochemical properties of each of the plurality of polymers, the physicochemical properties comprising a combination of polydispersity index (PDI), radius of gyration ($R_g$), concentration (conc) and weight average molecular weight (Mw);
    correlating a fluid loss performance of each polymer in the plurality of polymers to the measured physicochemical properties of each of the plurality of polymers, wherein the correlating uses a model of the form of:

$$\ln(FL) = A + B^*PDI + C^*R_g + D[CONC] + E^*Mw$$

where A, B, C, D, and E are constants and FL is fluid loss, where A, B, C, D, and E are determined by regression analysis of PDI, $R_g$, Mw, and fluid loss at a concentration for each polymer in the plurality of polymers;
    selecting a polymer from the plurality of polymers such that the correlated fluid loss performance of a treatment fluid prepared with the polymer satisfies the specification requirements for fluid loss control;
    preparing a test fluid comprising the selected polymer;
    measuring a fluid loss of the test fluid;
    preparing a treatment fluid comprising the selected polymer when the fluid loss of the test fluid is less than the specification requirements for fluid loss control, wherein the preparing of the treatment fluid accounts for an effect of $R_g$ of the selected polymer on the fluid loss performance and is based, at least in part, on the constants; and
    introducing the treatment fluid into a wellbore.

2. The method of claim 1 wherein correlating fluid loss performance of each polymer comprises correlating polydispersity index to wet time of each polymer.

3. The method of claim 2 wherein the selecting a polymer from the plurality of polymers comprises selecting a concentration of the polymer based at least in part of the correlation of polydispersity index to wet time.

4. The method of claim 3 further comprising providing a required wet time, a required fluid loss performance, or both and wherein selecting a concentration of the polymer comprises selecting a concentration of the polymer such that the polymer provides the required wet time and/or the required fluid loss performance.

5. The method of claim 1 wherein the fluid comprises at least one fluid selected from the group consisting of a cement slurry, a spacer fluid, a displacement fluid, a flushing fluid, and combinations thereof.

6. A method of designing a cement that has a fluid loss requirement comprising:
    providing a plurality of polymers, specification requirements for fluid loss control and wet time of a cement slurry comprising a polymer;
    measuring physicochemical properties of each of the plurality of polymers, the physicochemical properties comprising polydispersity index (PDI), radius of gyration ($R_g$), concentration (conc) and weight average molecular weight (Mw);
    estimating the fluid loss performance and wet time of each of the plurality of polymers by entering the measured physicochemical properties of each of the plurality of polymers using a model of fluid loss, wherein correlating fluid loss performance and wet time of each of the plurality of polymers comprises using a model of fluid loss, the model being a function of at least one physical property of a polymer, wherein the model is of the form of:

$$\ln(FL)=A+B*\text{PDI}+C*R_g+D[\text{CONC}]+E*\text{Mw}$$

where A, B, C, D, and E are constants and FL is fluid loss, where A, B, C, D, and E are determined by regression analysis of PDI, $R_g$, Mw, and fluid loss at a concentration for each polymer in the plurality of polymers;
selecting at least one polymer from the plurality of polymers such that the estimated fluid loss performance of a treatment fluid prepared with the polymer satisfies the fluid loss specification and wet time specification;
preparing a test fluid comprising the selected polymer;
measuring a fluid loss of the test fluid;
preparing a cement slurry comprising the selected polymer when the fluid loss of the test fluid is less than the fluid loss specification, wherein the preparing of the cement slurry accounts for an effect of $R_g$ of the selected polymer on the fluid loss performance and is based, at least in part, on the constants; and
introducing the cement slurry into a wellbore.

7. The method of claim 6 wherein selecting at least one polymer from the plurality of polymers comprises selecting a polymer that meets or exceeds the required wet time, the required fluid loss performance, or both.

8. The method of claim 7 wherein selecting at least one polymer from the plurality of polymers further comprises selecting a concentration of the polymer based at least in part on fluid loss performance and wet time of the polymer and the required fluid loss performance.

9. The method of claim 6 wherein the cement slurry comprises the at least one polymer, a cementitious material, and water.

10. The method of claim 6 further comprising placing the cement slurry in a wellbore.

11. A method of well treatment comprising:
providing a plurality of polymers and specification requirements for fluid loss control;
measuring physicochemical properties of each of the plurality of polymers, the physicochemical properties comprising polydispersity index (PDI), radius of gyration ($R_g$), concentration (conc) and weight average molecular weight (Mw);
estimating the fluid loss performance and wet time, using a model, entering the measured physicochemical properties of each of the plurality of polymers, wherein the model is in the form of:

$$FL=K*P(\text{PDI})^{\alpha}*R(R_g)^{\beta}*C([\text{Conc}])^{\gamma}*D(\text{Mw})^{\delta}$$

where $\alpha$, $\beta$, $\gamma$, $\delta$, K, P, R, C, and D are constants and FL is fluid loss, where $\alpha$, $\beta$, $\gamma$, $\delta$, K, P, R, C, and D are determined by regression analysis of PDI, $R_g$, Mw, and fluid loss at a concentration for each polymer in the plurality of polymers;
selecting at least one polymer and concentration thereof from the plurality of polymers, wherein the selected at least one polymer and concentration thereof meets or exceeds a required wet time and a required fluid loss performance, wherein the selecting is at least partially based on the estimated fluid loss performance and wet time of the at least one polymer;
preparing a test fluid comprising the selected polymer and concentration;
measuring a fluid loss of the test fluid;
preparing a cement slurry comprising the at least one polymer and the concentration thereof when the fluid loss of the test fluid is less than the specification requirements for fluid loss control, wherein the preparing of the cement slurry accounts for an effect of $R_g$ of the at least one selected polymer on the fluid loss performance and is based, at least in part, on the constants; and
introducing the cement slurry into a wellbore.

12. The method of claim 11 wherein the cement slurry comprises the at least one polymer, a cementitious material, and water.

* * * * *